United States Patent
Xu et al.

(10) Patent No.: US 10,992,386 B2
(45) Date of Patent: Apr. 27, 2021

(54) METHOD FOR IMPLEMENTING VARIABLE OPTICAL SPLITTER AND VARIABLE OPTICAL SPLITTER

(71) Applicant: ZTE Corporation, Shenzhen (CN)

(72) Inventors: Jidong Xu, Shenzhen (CN); Zhiming Fu, Shenzhen (CN); Mingsheng Li, Shenzhen (CN); Zhuang Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/505,461

(22) PCT Filed: Nov. 18, 2014

(86) PCT No.: PCT/CN2014/091433
§ 371 (c)(1),
(2) Date: Feb. 21, 2017

(87) PCT Pub. No.: WO2016/026228
PCT Pub. Date: Feb. 25, 2016

(65) Prior Publication Data
US 2017/0272160 A1 Sep. 21, 2017

(30) Foreign Application Priority Data
Aug. 22, 2014 (CN) .......................... 201410419381.7

(51) Int. Cl.
*H04B 10/25* (2013.01)
*H04J 14/02* (2006.01)

(52) U.S. Cl.
CPC ........ *H04B 10/25891* (2020.05); *H04J 14/02* (2013.01); *H04J 14/0227* (2013.01)

(58) Field of Classification Search
CPC .... H04B 10/2504; H04J 14/02; H04J 14/0227
See application file for complete search history.

(56) References Cited

U.S. PATENT DOCUMENTS

2002/0150329 A1  10/2002  Ahn et al.
2009/0245794 A1  10/2009  Sakharov

FOREIGN PATENT DOCUMENTS

| CN | 101267259 A | 9/2008 |
|---|---|---|
| CN | 102546020 A | 7/2012 |
| EP | 1953941 A1 | 8/2008 |

OTHER PUBLICATIONS

International Search Report for corresponding application PCT/CN2014/091433 filed on Nov. 18, 2014; dated May 14, 2015.

(Continued)

*Primary Examiner* — Leslie C Pascal
(74) *Attorney, Agent, or Firm* — Cantor Colburn LLP (57) ABSTRACT

A method for implementing a variable optical splitter and a variable optical splitter are provided. The method includes that: the variable optical splitter is divided into one or more virtual optical splitting units according to wavelengths/wavebands of optical signals, wherein the virtual optical splitting units and the wavelengths/wavebands are in a one-to-one correspondence, and moreover, the wavelengths/wavebands and splitting ratios are also in a one-to-one correspondence; and optical guiding or optical splitting is performed on the incident optical signals through the virtual optical splitting units. By adopting the technical solutions provided by the present disclosure, the technical problems that there is yet no optical splitter with a variable splitting ratio in the related technology and the like are solved, and controllability of the splitting ratios of the optical splitter is achieved.

13 Claims, 7 Drawing Sheets

(56) References Cited

OTHER PUBLICATIONS

Christi K. Madsen et al. "Optical Filter Design and Analysis", John Wiley & Sons, Inc., 1999, pp. 1-418, URL:ftp://nozdr.ru/biblio/kolxo3/E/EO/Mads en C.K., Zhao J. H. Optical filter design and analysis.
Extended European Search Report dated Aug. 11, 2017 re: Application No. 14900096.0-1874 / 3185442 PCT/CN2014/091433; pp. 1-11, citing: Horst et al., "Cascaded Mac-Zehnder . . . ", Madsen et al. "Optical Filter . . . ", US 2009/245794 and US 2002/150329 A.
Folkert Horst et al. "Caascaded Mach-Zehnder wavelength filters in silicon photonics for low loss and flat pass-band WDM (de-)multiplexing", Optics Express, May 6, 2013, vol. 21, No. 10, pp. 11652-11658, XP055394706.

MZ type IL wavelength-sensitive optical splitter

METHOD FOR IMPLEMENTING VARIABLE OPTICAL SPLITTER AND VARIABLE OPTICAL SPLITTER

TECHNICAL FIELD

The present disclosure relates to the field of communication, and more particularly to a method for implementing a variable optical splitter and the variable optical splitter.

BACKGROUND

Along with mature development of an optical fiber communication technology and continuous promotion of a requirement of the modern information society on a network, an optical fiber network has taken the place of a copper wire communication network, and networks from a core network and a bearer network to an access network and further Fiber To The Home (FTTH) almost cover all communication networks.

Figure 1:
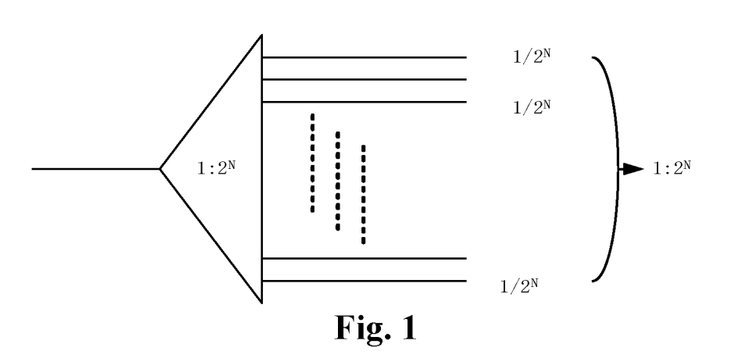
FIG. 1 is a basic structure diagram of an ordinary $1:2^N$ optical splitter according to the related technology.

However, an access network is confronted with multiple challenges, and in order to save resources, three networks of mobile communication, telecommunication and broadcast and television are integrated, that is, the same optical access network is shared. This causes diversity of access terminal users and diversifies requirements as well as fixation of an Optical Distribution Network (ODN). As shown in FIG. 1, a splitting ratio of the users may not be changed once the ODN selects a corresponding optical splitter, so that it is difficult to achieve adaptability to changes, i.e. mobility, of the terminal users. Therefore, there is an urgent need of an Intelligent Passive Optical Network (iPON) which may be adapted to such a requirement. In view of this, it is necessary to find a passive optical splitter with a controllable splitting ratio. An Optical Line Terminal (OLT) may provide a communication channel with a corresponding splitting ratio for a terminal of a corresponding branch optical fiber according to a requirement, and a key for meeting such a requirement is to find an optical splitter with a variable splitting ratio, which is called a variable optical splitter for short hereinafter.

For the problem in a related technology, there is yet no effective solution.

SUMMARY

For the technical problems that there is yet no optical splitter with a variable splitting ratio in the related technology and the like, the present disclosure provides a method for implementing a variable optical splitter and the variable optical splitter, to at least solve the technical problems.

According to an embodiment of the present disclosure, a method for implementing a variable optical splitter is provided, which may include that: the variable optical splitter is divided into one or more virtual optical splitting units according to wavelengths/wavebands of optical signals, wherein the virtual optical splitting units may correspond to the wavelengths/wavebands one to one, and moreover, the wavelengths/wavebands may correspond to splitting ratios one to one; and optical guiding or optical splitting is performed on the incident optical signals through the virtual optical splitting units.

Preferably, the variable optical splitter may be a $1:2^N$ optical splitter; and a value interval of an optical splitting level K of the variable optical splitter may be [1, N+1], N may be a natural number, and each optical splitting level K may correspond to one or more virtual optical splitting units.

Preferably, in case of the optical splitting level K=j, a required wavelength/waveband number A may be determined in the following manner: $A=2^{j-1}$, wherein j may be a natural number.

Preferably, when all the optical splitting levels K coexist, a total required wavelength/waveband number B may be determined in the following manner: $B=2^N+2^{N-1}+ \ldots +2^1+2^0$, wherein N may be a natural number.

Preferably, the virtual optical splitting units may include: Point-to-Point (P2P) optical splitting units and non-P2P optical splitting units, wherein the P2P optical splitting units may be configured for P2P transparent transmission of the optical signals of specified wavelengths/wavebands, and the non-P2P optical splitting units may be configured to perform optical slitting on the optical signals according to the wavelengths/wavebands.

Preferably, the P2P optical splitting units may be determined in the following manner: the virtual optical splitting units corresponding to a maximum optical splitting level K=N+1 are determined as the P2P optical splitting units.

Preferably, the P2P optical splitting units may be determined in the following manner: when the variable optical splitter includes P2P optical splitters, the P2P optical splitters are determined as the P2P optical splitting units, wherein the P2P optical splitters may allow P2P transparent transmission of the optical signals of the specified wavelengths/wavebands.

Preferably, when the P2P optical splitters and non-P2P optical splitters coexist, a required wavelength/waveband number C may be determined in the following manner: $C=D+E$, wherein $D=2^N$ may represent a wavelength/waveband number required by the P2P optical splitters, and E may represent a wavelength/waveband number required by the non-P2P optical splitters.

Preferably, the variable optical splitter may include a wavelength-sensitive optical splitter, or the variable optical splitter may include: the wavelength-sensitive optical splitter and another optical splitting device, wherein the other optical splitting device may include: an ordinary optical splitter and/or an P2P optical splitter; the wavelength-sensitive optical splitter may be configured to perform optical guiding or optical splitting on the wavelengths/wavebands of the optical signals; and the ordinary optical splitter may be configured to equally distribute the optical signals according to power, and the P2P optical splitter may be configured to perform optical splitting uniformly according to the wavelengths/wavebands of the optical signals and/or perform P2P transparent transmission on the optical signals of the specified wavelengths/wavebands.

Preferably, when the value interval of the optical splitting level K is [1, 2], the variable optical splitter may include: a wavelength-sensitive optical splitter and two $1:2^{N-1}$ ordinary optical splitters, wherein the wavelength-sensitive optical splitter may be connected with the two $1:2^{N-1}$ ordinary optical splitters respectively.

Preferably, when the value interval of the optical splitting level K is [1, 3], the variable optical splitter may include: a first wavelength-sensitive optical splitter connected with a second wavelength-sensitive optical splitter and a third wavelength-sensitive optical splitter respectively, meanwhile, the second wavelength-sensitive optical splitter may be connected with a first $1:2^{N-1}$ ordinary optical splitter and a second $1:2^{N-1}$ ordinary optical splitter respectively, and the third wavelength-sensitive optical splitter may be connected with a third $1:2^{N-1}$ ordinary optical splitter and a fourth $1:2^{N-1}$ ordinary optical splitter respectively.

Preferably, when the value interval of the optical splitting level K is [1, 2] and a partial P2P function is included, the variable optical splitter may include: a wavelength-sensitive optical splitter, a $1:2^{N-1}$ ordinary optical splitter and a $1:2^{N-1}$ P2P optical splitter, wherein the wavelength-sensitive optical splitter may be connected with the $1:2^{N-1}$ ordinary optical splitter and the $1:2^{N-1}$ P2P optical splitter respectively.

Preferably, the wavelength-sensitive optical splitter may be implemented by the following device: an optical wavelength Interleaver (IL).

Preferably, the P2P optical splitter may be a device integrating both arrayed waveguide and optical splitting functions.

According to another embodiment of the present disclosure, a variable optical splitter is provided, which may include: a wavelength-sensitive optical splitter, configured to be divided into one or more virtual optical splitting units according to wavelengths/wavebands of optical signals and perform optical guiding or optical splitting through the virtual optical splitting units, wherein each wavelength/waveband may correspond to splitting ratios one to one, and the virtual optical splitting units may correspond to the wavelengths/the wavebands one to one.

Preferably, the variable optical splitter may be a $1:2^N$ optical splitter; and a value range of an optical splitting level K of the virtual optical splitting units may be [1, N+1], N may be a natural integer, and each optical splitting level K may and one or more virtual optical splitting units.

According to another embodiment of the present disclosure, a variable optical splitter is provided, which may include: the abovementioned wavelength-sensitive optical splitter and at least one of an ordinary optical splitter and a P2P optical splitter, wherein the wavelength-sensitive optical splitter may be configured to perform optical guiding or optical splitting according to wavelengths/wavebands of optical signals; and the ordinary optical splitter may be configured to uniformly distribute the optical signals according to optical power, and the P2P optical splitter may be configured to perform uniform optical splitting according to the wavelengths/wavebands of the optical signals or perform P2P transparent transmission on the optical signals of specified wavelengths/wavebands.

According to the present disclosure, the following technical means is adopted: the optical signals subjected to optical splitting are distributed to the virtual optical splitting units, wherein the virtual optical splitting units are obtained by the optical splitter on the basis of the preplanned wavelengths/wavebands, and the splitting ratios of the virtual optical splitting units correspond to the preplanned wavelengths/wavebands, so that the technical problems that there is yet no optical splitter with a variable splitting ratio in the related technology and the like are solved, and controllability of the splitting ratios of the optical splitter is further achieved.

BRIEF DESCRIPTION OF THE DRAWINGS

The drawings described here are adopted to provide a further understanding to the present disclosure, and form a part of the present disclosure. Schematic embodiments of the present disclosure and descriptions thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

Figure 2:
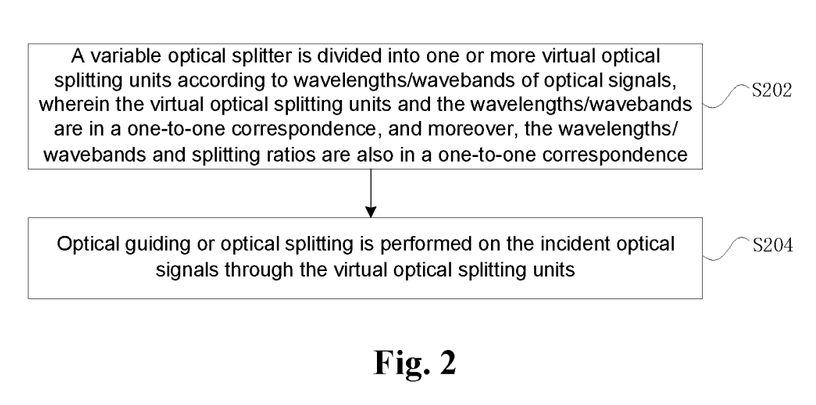
FIG. 2 is a flowchart of a method for implementing a variable optical splitter according to an embodiment of the present disclosure.

FIG. 2 is a flowchart of for a method for implementing a variable optical splitter according to an embodiment of the present disclosure. As shown in FIG. 2, the method includes the following steps.

Step S202: the variable optical splitter is divided into one or more virtual optical splitting units according to wavelengths/wavebands of optical signals, wherein the virtual optical splitting units and the wavelengths/wavebands are in a one-to-one correspondence, and moreover, the wavelengths/wavebands and splitting ratios are also in a one-to-one correspondence. That is, the variable optical splitter may be virtually divided into the one or more virtual optical splitting units according to the wavelengths/wavebands of the incident optical signals, and the virtual optical splitting units correspond to the wavelengths/wavebands one to one, and correspond to the corresponding splitting ratios.

Step S204: optical guiding or optical splitting is performed on the incident optical signals through the virtual optical splitting units.

By each processing step, the multiple virtual optical splitting units may be divided according to the wavelengths/wavebands of the optical signals, in addition, each virtual optical splitting unit and the wavelengths/wavebands are in a one-to-one correspondence, and moreover, the wavelengths/wavebands and the splitting ratios are also in a one-to-one correspondence, so that each virtual optical splitting unit may correspond to a splitting ratio; and therefore, the wavelengths/wavebands of the optical signals may be regulated to implement regulation of the splitting ratios, that is, splitting ratio variability is achieved, and controllability of the splitting ratios of the optical splitter is further achieved.

It is important to note that the variable optical splitter is divided through planned optical wavelengths/wavebands. For example, an optical splitter with K levels of variable splitting ratios (shown in FIG. 3) has $2^{i-1}$ wavelengths/wavebands, and correspondingly has $2^{i-1}$ virtual optical splitters, these wavelengths/wavebands are planned, while the unplanned wavelengths/wavebands have no such characteristic when passing through the optical splitter, and the wavelengths/wavebands mentioned-above are preplanned wavelengths/wavebands.

For a 1:32 optical splitter, if N=5, it has most K=6 levels of variable splitting ratios. For example, K=1 corresponds to 1:32, K=2 corresponds to 1:16, K=3 corresponds to 1:8, K=4 corresponds to 1:4, K=5 corresponds to 1:2 and K=6 corresponds to 1:1. Therefore, a K level number corresponding to most variable splitting ratios is determined by a numerical value of N of the optical splitter. The optical splitter with these variable splitting ratios may keep these splitting ratios simultaneously existing according to a requirement, that is, terminals on different branch optical fibers may select own required splitting ratios according to requirements. Different K levels of splitting ratios require wavelengths of light to be changed to achieve the corresponding splitting ratios in the corresponding wavelengths/wavebands, that is, the terminals on the branch optical fibers select to receive the corresponding wavelengths to indicate that they are located at the corresponding splitting ratios.

Descriptions will be made below with the condition that the variable optical splitter is a $1:2^N$ optical splitter as an example.

In a preferred embodiment, the variable optical splitter may be graded, wherein a value interval of an optical splitting level K of the variable optical splitter is [1, N+1], N is a natural number, and each optical splitting level K corresponds to one or more virtual optical splitting units.

In case of the optical splitting level K=j, a required wavelength/waveband number A is determined in the following manner: $A=2^{j-1}$, wherein j is a natural number; and when all the optical splitting levels K coexist, a total required wavelength/waveband number B is determined in the following manner: $B=2^N+2^{N-1}+\ldots+2^1+2^0$, wherein N is a natural number. For example, for the 1:32 optical splitter, if it has only one level K, it requires only one wavelength; if it has two levels K=1 and K=2 coexisting, a required wavelength number is $P=2^1+2^0=3$; if it has three levels K=1, K=2 and K=3 coexisting, the required wavelength number is $P=2^2+2^1+2^0=7$; and by parity of reasoning, if it has totally six levels K=1, K=2, K=3, K=4, K=5 and K=6 coexisting, the required wavelength number is $P=2^5+2^4+2^3+2^2+2^1+2^0=63$. Therefore, the required wavelength number is related to a variable level number and coexistence requirement of the variable splitting ratios.

In a preferred embodiment, the variable optical splitter may realize a P2P function, and at this moment, the virtual optical splitting units include: P2P optical splitting units and non-P2P optical splitting units, wherein the P2P optical splitting units are configured for P2P transparent transmission of the optical signals of specified wavelengths/wavebands, and the non-P2P optical splitting units are configured to perform optical splitting on the optical signals according to the wavelengths/wavebands.

Figure 4:
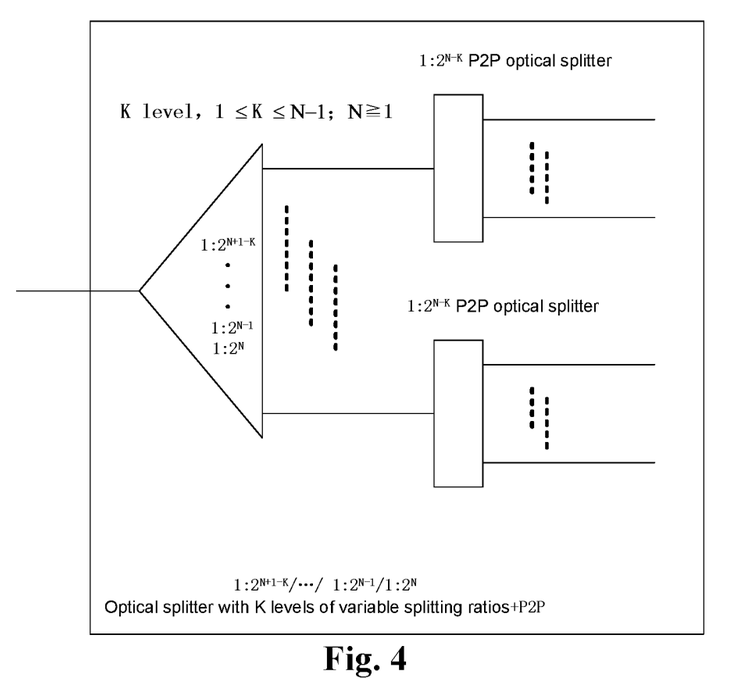
FIG. 4 is a basic structure diagram of a $1:2^N$ optical splitter with K levels of variable splitting ratios and an additional P2P function according to an embodiment of the present disclosure.

Wherein, the P2P optical splitting units may be determined in the following manners: the virtual optical splitting units corresponding to the maximum optical splitting level K=N+1 are determined as the P2P optical splitting units. That is, if the $1:2^N$ optical splitter has the totally K levels of variable splitting, the last level, i.e. K=N+1, realizes the P2P function. However, most of variable optical splitters usually have only a few levels of variable splitting, and if the P2P function is required, the technical solution is shown in FIG. 4.

In a preferred embodiment, the variable optical splitter may also be implemented through physical P2P optical splitters. That is, when the variable optical splitter includes P2P optical splitters, the P2P optical splitters are determined as the P2P optical splitting units, wherein the P2P optical splitters allow P2P transparent transmission of the optical signals of the specified wavelengths/wavebands. At this moment, when the P2P optical splitters and non-P2P optical splitter coexist, a required wavelength/waveband number C is determined in the following manner: C=D+E, wherein $D=2^N$ represents a wavelength/waveband number required by the P2P optical splitters, and E represents a wavelength/waveband number required by the non-P2P optical splitters. In a preferred embodiment, the variable optical splitter may adopt the following processing process.

Figure 5:
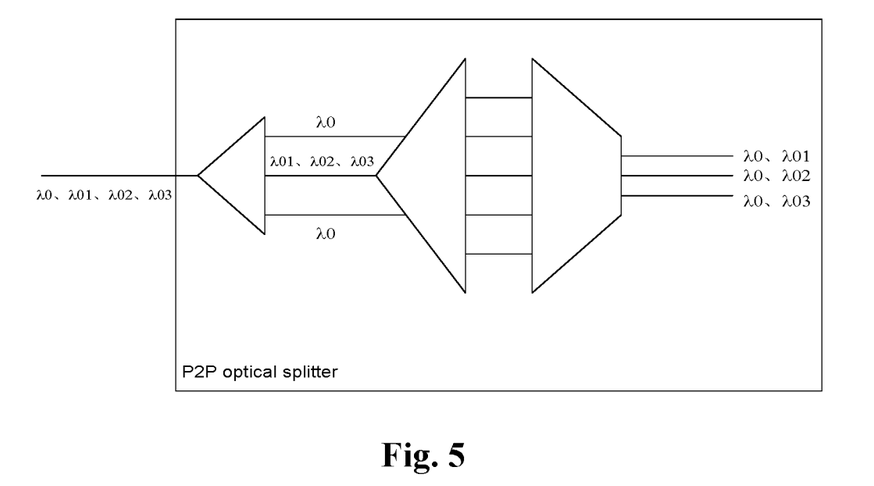
FIG. 5 is a basic structure diagram of a P2P optical splitter according to an embodiment of the present disclosure.

For the $1:2^N$ optical splitter, its N is ≥1, if it becomes an optical splitter with K levels of variable splitting ratios and the P2P function, it consists of an optical splitter with K levels (1≤K≤N−1) of variable splitting ratios and a few $1:2^{N-K+1}$ optical splitters with the P2P function, and its structure diagram is shown in FIG. 5. When P2P wavelengths pass the optical splitter, the optical splitter with the K levels of variable splitting ratios transparently transmits these wavelengths, while the P2P optical splitters represent an Arrayed Waveguide Grating (AWG) function, and namely guide the P2P wavelengths to corresponding branch optical fibers; if variable splitting ratio wavelengths pass through the optical splitter, the optical splitter with the K levels of variable splitting ratios guides them to the optical splitters of corresponding virtual splitting ratios according to the wavelengths, and then the P2P optical splitters equally divide power of the wavelengths for guiding to the branch optical fibers connected therewith; and if an unplanned wavelength passes through the optical splitter, an $^{N-K+1}$P2P optical splitter of the wavelength is combined with the optical splitter with the variable splitting ratios.

Based on combination of the P2P optical splitters and the optical splitter with the variable splitting ratios, its P2P function is not required to be realized by the highest K=N+1 of the K levels of variable splitting ratios, that is, any variable K level may be combined with the P2P optical splitters to realize the P2P function. These variable splitting ratios may coexist with the P2P function. A wavelength number required by all these coexistences is wavelengths required by the K=1st to ith levels of variable splitting ratios and P2P, that is, $P=2^{i-1}+2^{i-2}+\ldots+2^1+2^0+(2^{N-i}\times2^i)=2^{i-1}+2^{i-2}+\ldots+2^1+2^0+2^N$. For example: for a 1:32 optical splitter, its N is 5, and variable splitting ratios of the highest K level K=3 are adopted, for example: K=1 corresponds to 1:32, K=2 corresponds to 1:16 and K=3 corresponds to 1:8; and eight corresponding 1:4 P2P optical splitters are matched, and the totally required corresponding wavelength number is $2^0+2^1+2^2+2^5=39$. The solution has the advantage that the last K level of variable splitting is not required, so that a difficulty of the optical splitter with the variable splitting ratios is reduced, and the P2P function may also be realized in case of variable splitting of a part of K levels.

A physical structure of the variable optical splitter may include wavelength-sensitive optical splitters, or the variable optical splitter includes: the wavelength-sensitive optical splitters and other optical splitting devices, wherein the other optical splitting devices include: ordinary optical splitters and/or P2P optical splitters, wherein the wavelength-sensitive optical splitters are configured to perform optical guiding or optical splitting on the wavelengths/wavebands of the optical signals; and the ordinary optical splitters are configured to uniformly distribute the optical signals according to power, and the P2P optical splitters are configured to perform uniform optical splitting according to the wavelengths/wavebands of the optical signals and/or perform P2P transparent transmission of the optical signals of specified wavelengths/wavebands.

When the value interval of the optical splitting level K is [1, 2], the variable optical splitter includes: a first wavelength-sensitive optical splitter connected with a second wavelength-sensitive optical splitter and a third wavelength-sensitive optical splitter respectively, in addition, the second wavelength-sensitive optical splitter is connected with a first $1:2^{N-1}$ ordinary optical splitter and a second $1:2^{N-1}$ ordinary optical splitter respectively, and the third wavelength-sensitive optical splitter is connected with a third $1:2^{N-1}$ ordinary optical splitter and a fourth $1:2^{N-1}$ ordinary optical splitter respectively.

When the value interval of the optical splitting level K is [1, 3], the variable optical splitter includes: a first wavelength-sensitive optical splitter connected with a second wavelength-sensitive optical splitter and a third wavelength-sensitive optical splitter respectively, meanwhile, the second wavelength-sensitive optical splitter is connected with a first $1:2^{N-1}$ ordinary optical splitter and a second $1:2^{N-1}$ ordinary optical splitter respectively, and the third wavelength-sensitive optical splitter is connected with a third $1:2^{N-1}$ ordinary optical splitter and a fourth $1:2^{N-1}$ ordinary optical splitter respectively.

When the value interval of the optical splitting level K is [1, 2] and a partial P2P function is included, the variable optical splitter includes: a wavelength-sensitive optical splitter, a $1:2^{N-1}$ ordinary optical splitter and a $1:2^{N-1}$ P2P optical splitter, wherein the wavelength-sensitive optical splitter is connected with the $1:2^{N-1}$ ordinary optical splitter and the $1:2^{N-1}$ P2P optical splitter respectively.

In a preferred embodiment, the wavelength-sensitive optical splitter is implemented by the following device: an optical wavelength IL. The P2P optical splitter is a device integrating both arrayed waveguide and optical splitting functions.

The embodiment of the present disclosure also provides a variable optical splitter, which includes: a wavelength-sensitive optical splitter, configured to be divided into one or more virtual optical splitting units according to wavelengths/wavebands of optical signals and perform optical guiding or optical splitting through the virtual optical splitting units, wherein each wavelength/waveband corresponds to splitting ratios one to one, and the virtual optical splitting units correspond to the wavelengths/wavebands one to one. Preferably, the variable optical splitter is a $1:2^N$ optical splitter; and a value range of an optical splitting level K of the virtual optical splitting units is from 1 to N+1, N is a natural integer, and each optical splitting level K corresponds to one or more virtual optical splitting units.

The embodiment of the present disclosure further provides another variable optical splitter, which includes: the abovementioned wavelength-sensitive optical splitter and at least one of an ordinary optical splitter and a P2P optical splitter, wherein the wavelength-sensitive optical splitter is configured to perform optical guiding or optical splitting according to wavelengths/wavebands of optical signals; and the ordinary optical splitter is configured to uniformly distribute the optical signals according to power, and the P2P optical splitter is configured to perform optical splitting uniformly according to the wavelengths/wavebands of the optical signals or perform P2P transparent transmission on the optical signals of specified wavelengths/wavebands.

In order to better understand the abovementioned embodiment, detailed descriptions will be made below with reference to a preferred embodiment.

The embodiment discloses an optical splitter with a variable splitting ratio, and it is constructed by a wavelength-sensitive optical splitter. A downlink optical wavelength is regulated to change a splitting ratio of a terminal user. The technology and device meet technical requirements of passive optical splitter and an optical splitter with a variable splitting ratio.

A key of the embodiment is the wavelength-sensitive optical splitter, i.e. a Mach-Zehnder (MZ) type IL, and it may implement optical splitting on an optical wavelength according to an interleaving manner, as shown in FIG. 5. It may perform optical splitting on dense optical wavelengths at the same interval. For example, the MZ IL performs optical splitting on input light with four wavelengths $\lambda_1$, $\lambda_2$, $\lambda_3$ and $\lambda_4$, one arm outputs light of $\lambda_1$ and $\lambda_3$, and the other arm outputs light of $\lambda_2$ and $\lambda_4$, that is, optical splitting is performed according to the wavelengths. Therefore, it is called a wavelength-sensitive optical splitter. Then, it is adopted to construct the optical splitter with variable splitting ratio as the core.

The method of the present disclosure will be further described below with reference to the drawings in detail.

Figure 3:
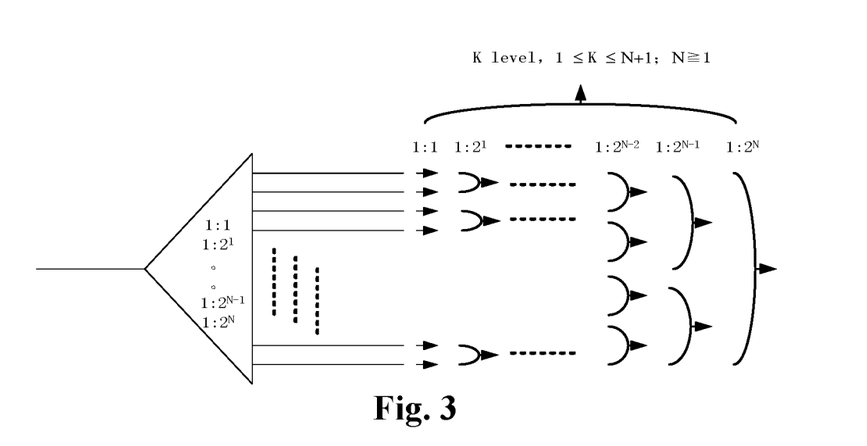
FIG. 3 is a basic structure diagram of a $1:2^N$ optical splitter with a variable splitting ratio according to an embodiment of the present disclosure.

FIG. 3 shows a basic structure of a $1:2^N$ optical splitter with K levels of variable splitting ratios according to the embodiment. Wherein, N≥1, 1≤K≤N+1, there are totally N+1 levels of optical splitters with virtual variable splitting ratios, and they are divided through wavelengths/wavebands. When K=1, the optical splitters of the virtual splitting ratio are $1:2^N$ optical splitters, and 20 optical wavelengths are required; and when K=2, the virtual optical splitting ratio is $1:2^{N-1}$, and $2^1$ optical wavelengths are required. The splitting ratio of the virtual optical splitter of the K=ith level is $1:2^{N+1-i}$, and the required optical wavelength number is $2^{i-1}$. The splitting ratio of the virtual optical splitters of the maximum K=N+1 level is $1:2^0=1:1$, and is namely equivalent to P2P, and the required optical wavelength number is $2^N$, that is, each user corresponds to a user. These variable splitting ratios may coexist, that is, there are multiple splitting ratios on the same optical splitter, and only a proper wavelength may be selected to change a corresponding branch optical fiber into the corresponding splitting ratio. If all the levels K=1 to i coexist, the total required wavelength number is $2^{i-1}+2^{i-2}+\ldots+2^1+2^0$, and if all K levels of optical splitting of a $1:2^N$ optical splitter coexist, the total wavelength number required by the $1:2^N$ optical splitter is $2^N+2^{N-1}+\ldots+2^1+2^0$.

FIG. 4 shows a basic structure of a $1:2^N$ optical splitter with K levels of variable splitting ratios and a P2P function. Wherein, N≥1, 1≤K≤N+1, there are totally N-1 levels of variable splitting ratios and the additional P2P function. The $1:2^N$ optical splitter is characterized in that the branch optical fiber may have the P2P function no matter whether there are K levels of variable splitting or not, and as long as a proper wavelength is selected, the branch optical fiber may have the corresponding splitting ratio or the P2P function, and the P2P function is additional, is independent from a level number of the variable splitting ratio, and has an obvious advantage particularly for an optical splitter with only few variable splitting ratios. The splitting ratio of an optical splitter with the P2P function and the variable splitting ratio of the K=ith level is $1:2^{N+1-i}$, and the required optical wavelength number is $2^{i-1}$. If coexistence of K=1 and K=i is considered, the required optical wavelength number is $2^N+2^{i-1}+2^{i-2}+\ldots+2^1+2^0$; and all the K levels coexist, the totally required optical wavelength number is $2^N+2^{i-1}\ldots+2^1+2^0$.

FIG. 5 shows a diagram of unit components of an optical splitter with a P2P function. From FIG. 5, it can be seen that it is a device integrating functions of an optical splitter and an AWG After entering a phase coupler, different wavelengths are divided into different channels for coupled separation after entering the AWG a wavelength of the optical splitter is uniformly divided in all the output channels, and a P2P wavelength is coupled to the corresponding output channel.

Figure 6:
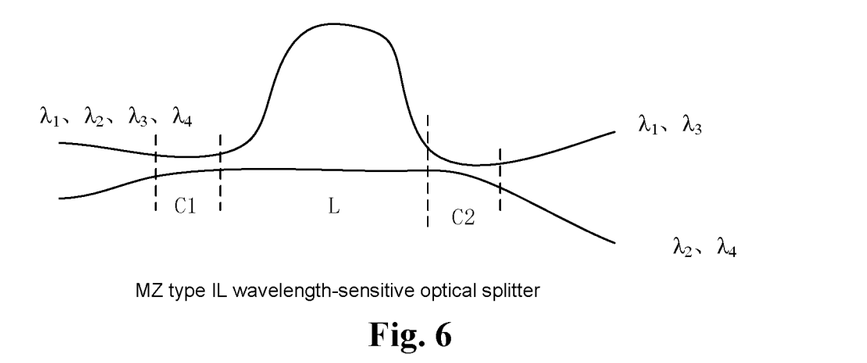
FIG. 6 is a basic structure diagram of an MZ type wavelength-sensitive optical splitter according to an embodiment of the present disclosure.

FIG. 6 shows a basic structure diagram of an MZ type wavelength-sensitive optical splitter. It is a key device of a variable optical splitter, and its working principle is that MZ interference is adopted to transmit light of different wavelengths through different optical paths, and particularly for wavelengths at equal intervals, odd wavelengths are transmitted through a branch arm, and even wavelengths are transmitted through another branch arm. In such a working manner, an optical splitter with a variable splitting ratio may be constructed.

Embodiments of some variable splitting ratios will be constructed below according to the principle mentioned in the preferred embodiment.

Figure 7:
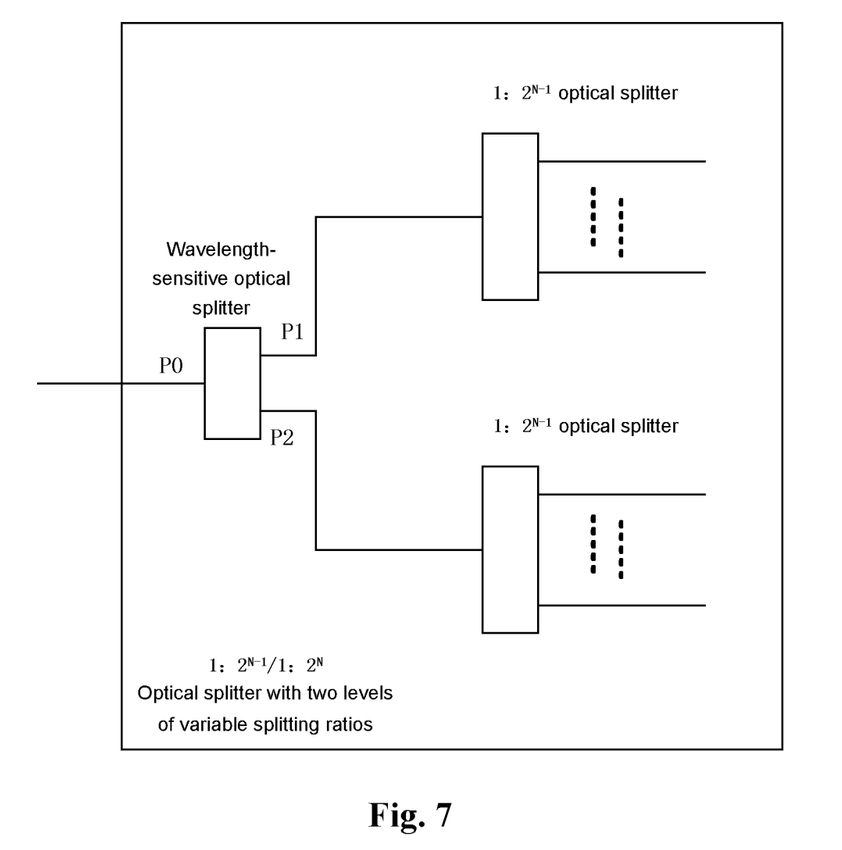
FIG. 7 is a diagram of unit components of an optical splitter with two levels of variable splitting ratios according to an embodiment of the present disclosure.

Embodiment 1: optical splitter with two levels of variable splitting ratios, as shown in FIG. 7

For a $1:2^N$ optical splitter with two levels of variable splitting ratios, it is a $1:2^N$ optical splitter if K=1, and is a $1:2^{N-1}$ optical splitter if K=2, and it consists of a wavelength-sensitive optical splitter and two $1:2^{N-1}$ ordinary optical splitters, as shown in FIG. 7. For the optical splitter corresponding to the variable splitting ratio of K=1, its corresponding wavelength is $\lambda_0$, and its splitting ratio is $1:2^N$; while for the optical splitter corresponding to the variable splitting ratio of K=2, its corresponding wavelengths are $\lambda_1$ and $\lambda_2$, and its splitting ratio is $1:2^{N-1}$. If coexistence is considered, two wavelengths $\lambda_0$ and $\lambda_1$ are required on a branch P1, and two wavelengths and $\lambda_0$ and $\lambda_2$ are required on a branch P2.

Figure 8:
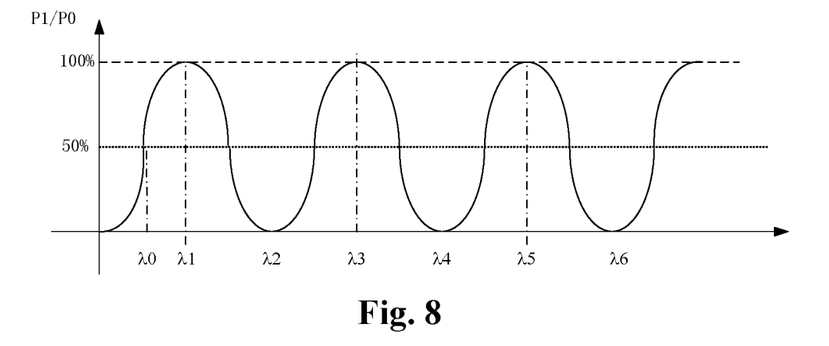
FIG. 8 is a wavelength power distribution diagram of a branch P1 of an optical splitter with two levels of variable splitting ratios according to an embodiment of the present disclosure.
Figure 9:
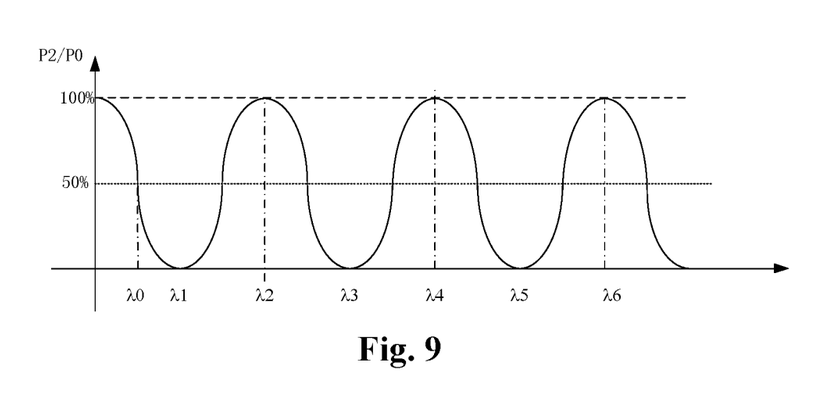
FIG. 9 is a wavelength power distribution diagram of a branch P2 of an optical splitter with two levels of variable splitting ratios according to an embodiment of the present disclosure.

In order to meet the requirement, it is necessary to design a special wavelength-sensitive optical splitter to make optical power and optical wavelengths on the branch P1 meet a curve shown in FIG. 8 and make optical power and optical wavelengths on the branch P2 meet a curve shown in FIG. 9, wherein a frequency interval between $\lambda_0$ and $\lambda_1$ is a half of an interval between $\lambda_0$ and $\lambda_2$, only $\lambda_0$ and $\lambda_1$ appear on the branch P1, and only $\lambda_0$ and $\lambda_2$ appear on the branch P2.

Figure 10:
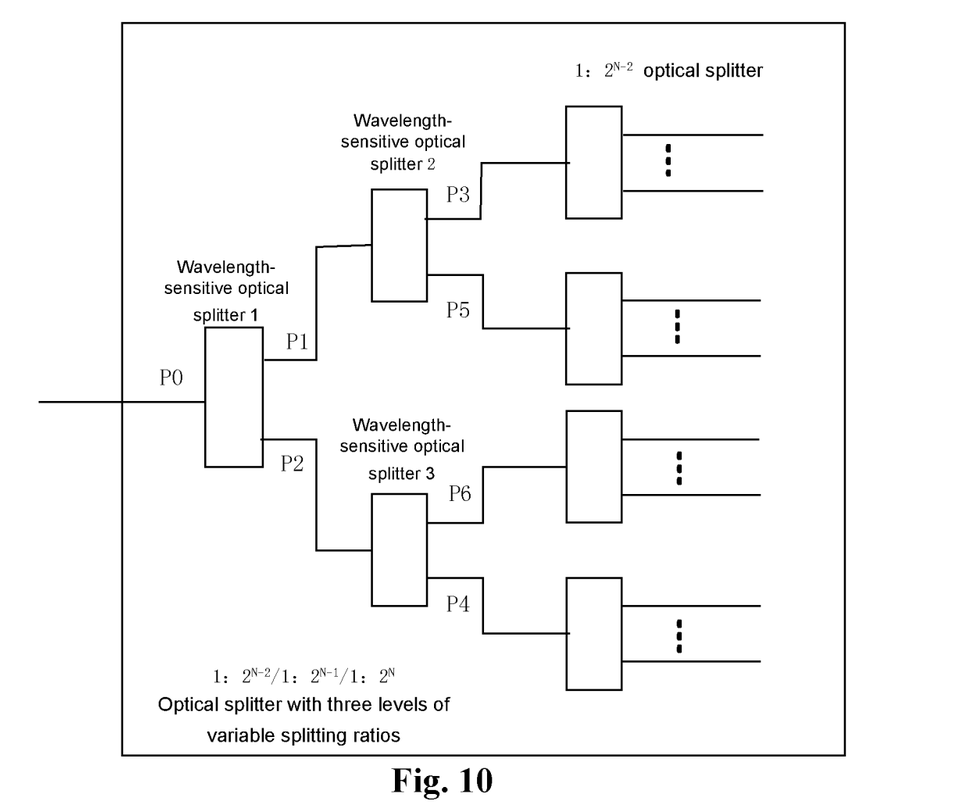
FIG. 10 is a diagram of unit components of an optical splitter with three levels of variable splitting ratios according to an embodiment of the present disclosure.

Embodiment 2: optical splitter with three levels of variable splitting ratios, as shown in FIG. 10

For a $1:2^N$ optical splitter with three levels of variable splitting ratios, it is a $1:2^N$ optical splitter if K=1, is a $1:2^{N-1}$ optical splitter if K=2 and is a $1:2^{N-2}$ optical splitter if K=3, and it consists of an ordinary wavelength-sensitive optical splitter, two special wavelength-sensitive optical splitters and four $1:2^{N-2}$ ordinary optical splitters, as shown in FIG. 10. For the optical splitter corresponding to the variable splitting ratio of K=1, its corresponding wavelength is $\lambda_0$, and its splitting ratio is $1:2^N$; for the optical splitter corresponding to the variable splitting ratio of K=2, its corresponding wavelengths are $\lambda_1$ and $\lambda_2$, and its splitting ratio is $1:2^{N-1}$; and for the optical splitter corresponding to the variable splitting ratio of K=3, its corresponding wavelengths are $\lambda_3, \lambda_4, \lambda_5$ and $\lambda_6$, and its splitting ratio is $1:2^{N-2}$. If coexistence is considered and totally 7 optical wavelengths are required, there are four wavelengths $\lambda_0, \lambda_1, \lambda_3$ and $\lambda_5$ on a branch P1, there are four wavelengths $\lambda_0, \lambda_2, \lambda_4$ and $\lambda_6$ on a branch P2, there are three wavelengths $\lambda_0, \lambda_1$ and $\lambda_5$ on a branch P3, there are three wavelengths $\lambda_0, \lambda_3$ and $\lambda$ on a branch P5, there are three wavelengths $\lambda_0, \lambda_2$ and $\lambda_6$ on a branch P4, and there are three wavelengths $\lambda_0, \lambda_4$ and $\lambda_6$ on a branch P6.

Figure 11:
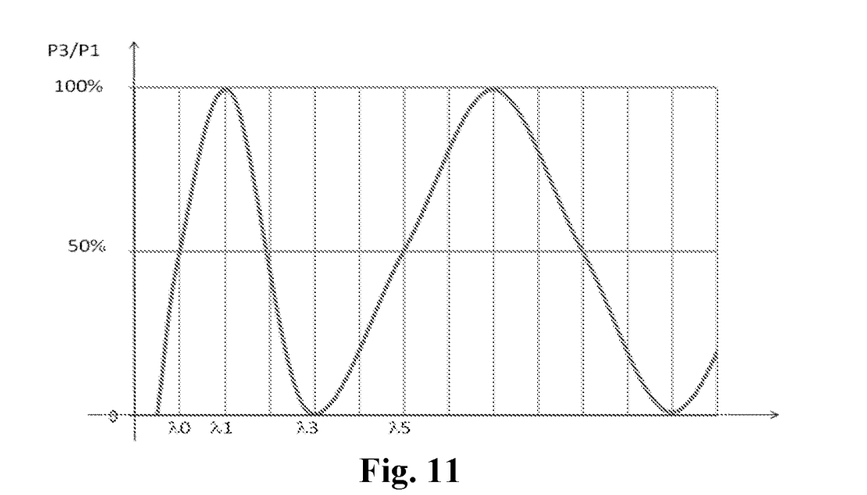
FIG. 11 is a wavelength power distribution diagram of a branch P3 of an optical splitter with three levels of variable splitting ratios according to an embodiment of the present disclosure.
Figure 12:
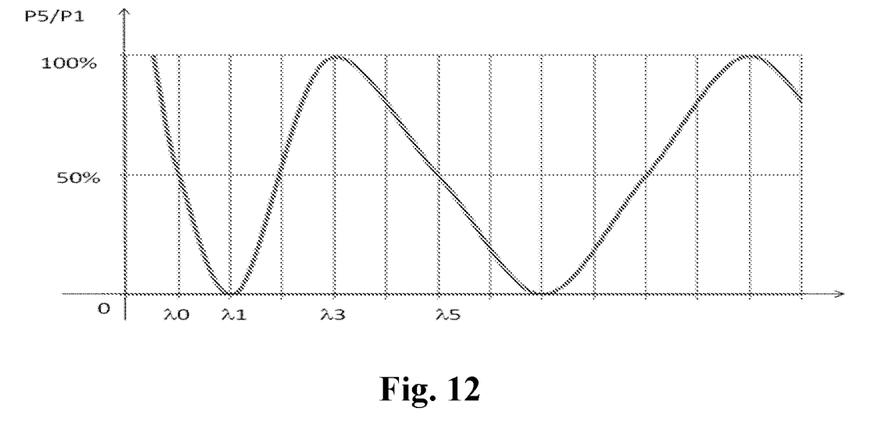
FIG. 12 is a wavelength power distribution diagram of a branch P5 of an optical splitter with three levels of variable splitting ratios according to an embodiment of the present disclosure.
Figure 13:
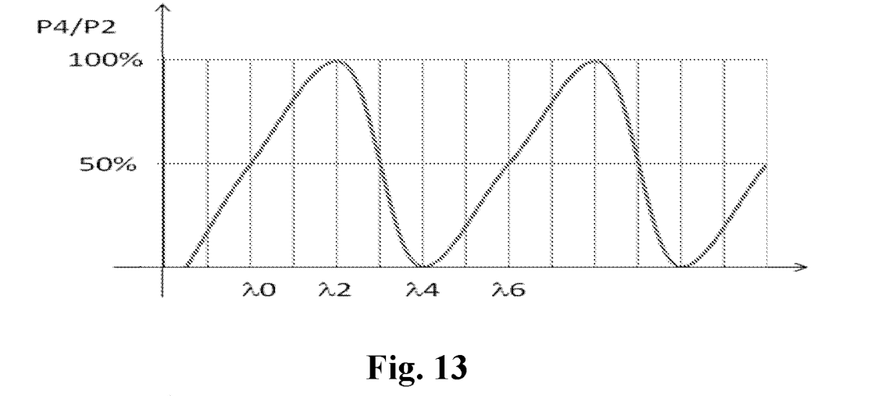
FIG. 13 is a wavelength power distribution diagram of a branch P2 of an optical splitter with three levels of variable splitting ratios according to an embodiment of the present disclosure.
Figure 14:
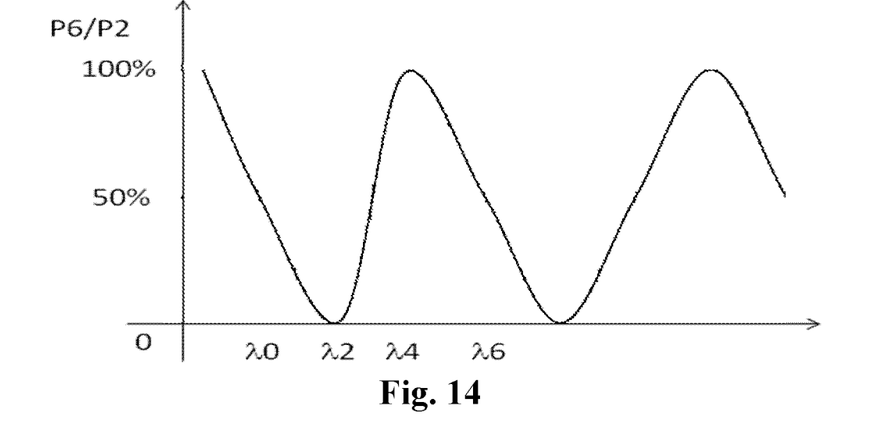
FIG. 14 is a wavelength power distribution diagram of a branch P4 of an optical splitter with three levels of variable splitting ratios according to an embodiment of the present disclosure.

In order to meet the requirement, besides the first level of wavelength-sensitive optical splitter is consistent with that shown in FIG. 7, it is also necessary to design two special wavelength-sensitive optical splitters to make optical power and optical wavelengths on the branch P3 meet a curve shown in FIG. 11, make optical power and optical wavelengths on the branch P5 meet a curve shown in FIG. 12, make optical power and optical wavelengths on the branch P4 meet a curve shown in FIG. 13 and make optical power and optical wavelengths on the branch P6 meet a curve shown in FIG. 14. The two special wavelength-sensitive optical splitters are different, and may not be confused for use. A difference with the first level of wavelength-sensitive optical splitter is that these power curves are not initially periodic, but frequency intervals from $\lambda_0$ to $\lambda_6$ are the same.

Figure 15:
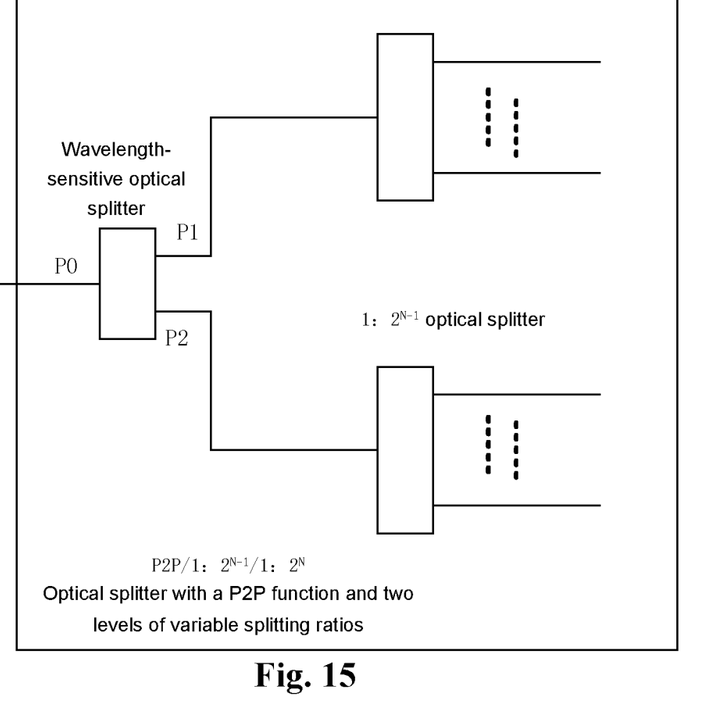
FIG. 15 is a diagram of unit components of an optical splitter with two levels of variable splitting ratios and a partial P2P function according to an embodiment of the present disclosure.

Embodiment 3: optical splitter with P2P and two levels of variable splitting ratios, shown in FIG. 15.

For a $1:2^N$ optical splitter with two levels of variable splitting ratios, it is a $1:2^N$ optical splitter if K=1, and is a $1:2^{N-1}$ optical splitter if K=2, and it consists of a wavelength-sensitive optical splitter, a $1:2^{N-1}$ ordinary optical splitter and a device integrating a $1:2^{N-1}$ optical splitter and an AWG, as shown in FIG. 15. For the optical splitter corresponding to the variable splitting ratio of K=1, its corresponding wavelength is $\lambda_0$, and its splitting ratio is $1:2^N$; while for the optical splitter corresponding to the variable splitting ratio of K=2, its corresponding wavelengths are $\lambda_1$ and $\lambda_2$, and its splitting ratio is $1:2^{N-1}$. If coexistence is considered, two wavelengths $\lambda_0$ and $\lambda_1$ are required on a branch P1, and meanwhile, there are a series of wavelengths $\lambda_{11}, \lambda_{12}, \lambda_{13}, \lambda_{14}, \ldots, \lambda_{1x}$ (x=1, \ldots, $2^{N-1}$)

in the vicinity of $\lambda_1$. Since the optical splitter on the branch P1 particularly has the characteristic of integrating functions of the optical splitter and the AWG these wavelengths of the series may be transmitted through corresponding branch optical fibers, so that a P2P function is realized, that is, a terminal user on the branch has a function of exclusively utilizing a wavelength. If $\lambda_0$ or $\lambda_1$ is input, a power equal division function of the optical splitter is recovered.

Two wavelengths $\lambda_0$ or $\lambda_2$ are required on a branch P2, $\lambda_0$ turns it into the $1:2^N$ optical splitter, while $\lambda_2$ turns it into the $1:2^{N-1}$ optical splitter.

Figure 16:
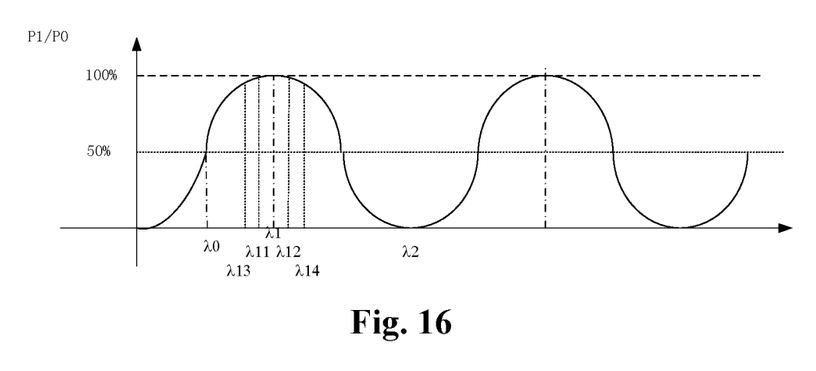
FIG. 16 is a wavelength power distribution diagram of a branch P1 of an optical splitter with two levels of variable splitting ratios and a partial P2P function according to an embodiment of the present disclosure.

In order to meet the requirement, it is necessary to design a special wavelength-sensitive optical splitter to make optical power and optical wavelengths on the branch P1 meet a curve shown in FIG. 16 and make optical power and optical wavelengths on the branch P2 meet a curve shown in FIG. 9, wherein a frequency interval between $\lambda_0$ and $\lambda_1$ is a half of an interval between and $\lambda_0$ and $\lambda_2$, only $\lambda_0, \lambda_1$ and the wavelengths of the series $\lambda_{1x}$ (x=1, ..., $2^{N-1}$) appear on the branch P1, and only $\lambda_0$ and $\lambda_2$ appear on the branch P2.

In another embodiment, software is further provided, which is configured to execute the technical solutions described in the abovementioned embodiment and preferred implementation mode.

In another embodiment, a storage medium is further provided, in which the abovementioned software is stored, the storage medium including, but not limited to: an optical disk, a floppy disk, a hard disk, an erasable memory and the like.

Obviously, those skilled in the art should know that each module or each step of the present disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the present disclosure is not limited to any specific hardware and software combination.

The above is only the preferred embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

The technical solutions provided by the present disclosure may be applied to the implementation process of the variable optical splitter: the following technical means is adopted: the optical signals subjected to optical splitting are distributed to the virtual optical splitting units, wherein the virtual optical splitting units are obtained by the optical splitter on the basis of the preplanned wavelengths/wavebands, and the splitting ratios of the virtual optical splitting units and the preplanned wavelengths/wavebands, so that the technical problems that there is yet no optical splitter with a variable splitting ratio in the related technology and the like are solved, and controllability of the splitting ratios of the optical splitter is further achieved.

What is claimed is:

1. A method for implementing a cascaded optical splitter, comprising:
    the cascaded optical splitter includes multiple splitting units, wherein the multiple splitting units are cascaded, and at least one of the splitting units is a wavelength-sensitive optical splitter including a first branch optical fiber P1 configured to output at least one first optical signal having at least one first wavelength/waveband, and a second branch optical fiber P2 configured to output at least one second optical signal having at least one second wavelength/waveband; and
    performing, by the cascaded optical splitter, optical guiding or optical splitting on optical signals according to wavelengths/wavebands of the optical signals,
    wherein the cascaded optical splitter is a $1:2^N$ optical splitter; and a value interval of an optical splitting level K of the cascaded optical splitter is [1, N+1], N is a natural number, and each optical splitting level K corresponds to one or more optical splitting units,
    wherein the cascaded optical splitter comprises:
    the wavelength-sensitive optical splitter configured to perform optical guiding or optical splitting on the wavelengths/wavebands of the optical signals; and;
    another optical splitting device, wherein the another optical splitting device comprises:
        a Point-to-Point (P2P) optical splitter in signal communication with the first optical fiber branch P1 and configured to perform one or both of optical splitting uniformly according to the first wavelengths/wavebands of the at least one first optical signal and P2P transparent transmission on the at least one first optical signal of the first wavelengths/wavebands; and
        an ordinary optical splitter in signal communication with the second optical fiber branch P2 and configured to uniformly distribute the at least one second optical signal according to power.

2. The method according to claim 1, wherein, in case of the optical splitting level K=j, a required wavelength/waveband number A is determined in the following manner:

$$A=2^{j-1},$$

wherein j is a natural number.

3. The method according to claim 1, wherein, when all the optical splitting levels K coexist, a total required wavelength/waveband number B is determined in the following manner:

$$B=2^N+2^{N-1}+\ldots+2^1+2^0,$$

wherein N is a natural number.

4. The method according to claim 1, wherein the P2P optical splitting units are determined in the following manner:
    when the cascaded optical splitter comprises P2P optical splitters, the P2P optical splitters are determined as the P2P optical splitting units, wherein the P2P optical splitters allow P2P transparent transmission of the optical signals of the specified wavelengths/wavebands.

5. The method according to claim 4, wherein, when the P2P optical splitters and non-P2P optical splitters coexist, a required wavelength/waveband number C is determined in the following manner:

C=D+E, wherein D=$2^N$ represents a wavelength/waveband number required by the P2P optical splitters, and E represents a wavelength/waveband number required by the non-P2P optical splitters.

6. The method according to claim 1, wherein, when the value interval of the optical splitting level K is [1, 2], the cascaded optical splitter comprises:
a wavelength-sensitive optical splitter and two 1:$2^{N-1}$ ordinary optical splitters, wherein the wavelength-sensitive optical splitter is connected with the two 1:$2^{N-1}$ ordinary optical splitters respectively.

7. The method according to claim 1, wherein, when the value interval of the optical splitting level K is [1, 3], the cascaded optical splitter comprises:
a first wavelength-sensitive optical splitter is connected with a second wavelength-sensitive optical splitter and a third wavelength-sensitive optical splitter respectively, and the second wavelength-sensitive optical splitter is connected with a first 1:$2^{N-1}$ ordinary optical splitter and a second 1:$2^{N-1}$ ordinary optical splitter respectively, and the third wavelength-sensitive optical splitter is connected with a third 1:$2^{N-1}$ ordinary optical splitter and a fourth 1:$2^{N-1}$ ordinary optical splitter respectively.

8. The method according to claim 1, wherein, when the value interval of the optical splitting level K is [1, 2] and a partial P2P function is comprised, the cascaded optical splitter comprises:
a wavelength-sensitive optical splitter, a 1:$2^{N-1}$ ordinary optical splitter and a 1:$2^{N-1}$ P2P optical splitter, wherein the wavelength-sensitive optical splitter is connected with the 1:$2^{N-1}$ ordinary optical splitter and the 1:$2^{N-1}$ P2P optical splitter respectively.

9. The method according to claim 1, wherein the wavelength-sensitive optical splitter is implemented by the following device: an optical wavelength Interleaver (IL).

10. The method according to claim 1, wherein the P2P optical splitter is a device integrating both arrayed waveguide and optical splitting functions.

11. A cascaded optical splitter, comprising:
multiple splitting units, wherein the multiple splitting units are cascaded and at least one of the splitting units is a wavelength-sensitive optical splitter, the wavelength-sensitive optical splitter including a first branch optical fiber P1 configured to output at least one first optical signal having at least one first wavelength/waveband, and a second branch optical fiber P2 configured to output at least one second optical signal having at least one second wavelength/waveband;
the cascaded optical splitter is configured to perform guiding or optical splitting on optical signals according to wavelengths/wavebands of the optical signals,
wherein the multiple splitting units further comprises:
at least one of an ordinary optical splitter in signal communication with the second optical fiber branch P2 and configured to uniformly distribute the at least one second optical signal according to power; and
a P2P optical splitter in signal communication with the first optical fiber branch P1 and configured to perform one or both of optical splitting uniformly according to the first wavelengths/wavebands of the at least one first optical signal and P2P transparent transmission on the at least one first optical signal of the first wavelengths/wavebands.

12. The cascaded optical splitter according to claim 11, wherein the cascaded optical splitter is a 1:$2^N$ optical splitter; and a value range of an optical splitting level K of the optical splitting units is [1, N+1], N is a natural integer, and each optical splitting level K corresponds to one or more optical splitting units.

13. A method for implementing a cascaded optical splitter, comprising:
the cascaded optical splitter includes multiple splitting units, wherein the multiple splitting units are cascaded, and at least one of the splitting units is a wavelength-sensitive optical splitter including a first branch optical fiber P1 configured to output at least one first optical signal having at least one first wavelength/waveband, and a second branch optical fiber P2 configured to output at least one second optical signal having at least one second wavelength/waveband; and
performing, by the cascaded optical splitter, optical guiding or optical splitting on optical signals according to wavelengths/wavebands of the optical signals,
wherein the cascaded optical splitter is a 1:$2^N$ optical splitter; and a value interval of an optical splitting level K of the cascaded optical splitter is [1, N+1], N is a natural number, and each optical splitting level K corresponds to one or more optical splitting units,
wherein the optical splitting units comprise: at least one Point-to-Point (P2P) optical splitting unit in signal communication with the first optical fiber branch P1 and configured to perform P2P transparent transmission on the at least one first optical signal having the at least one first wavelength/waveband; and
at least one non-P2P optical splitting unit in signal communication with the second optical fiber branch P2 and configured to perform optical splitting on the at least one second optical signal having the at least one second wavelength/waveband,
wherein the P2P optical splitting units are determined in the following manner:
the optical splitting units corresponding to a maximum optical splitting level K=N+1 being the P2P optical splitting units.

* * * * *